United States Patent Office 2,787,798
Patented Apr. 9, 1957

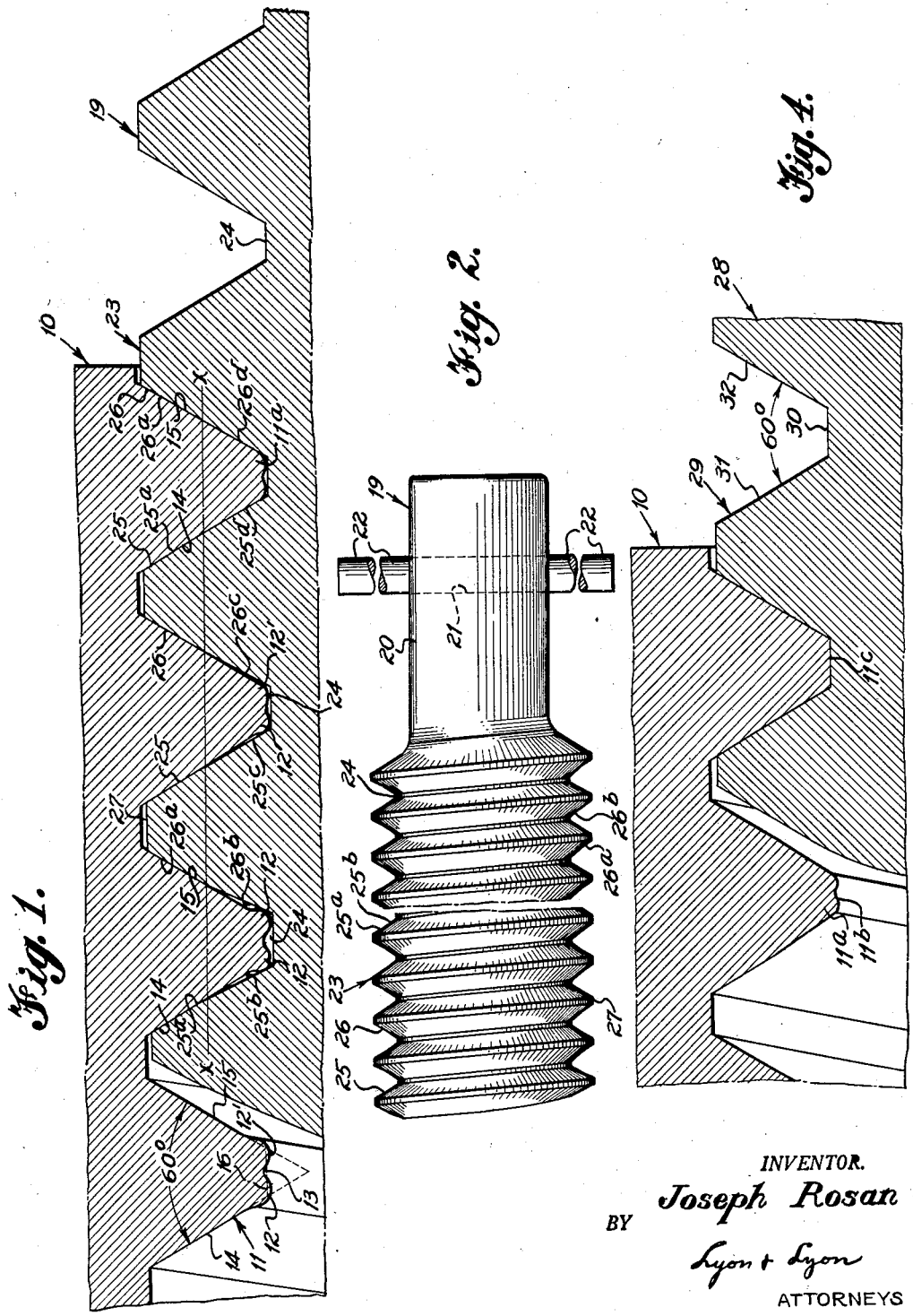

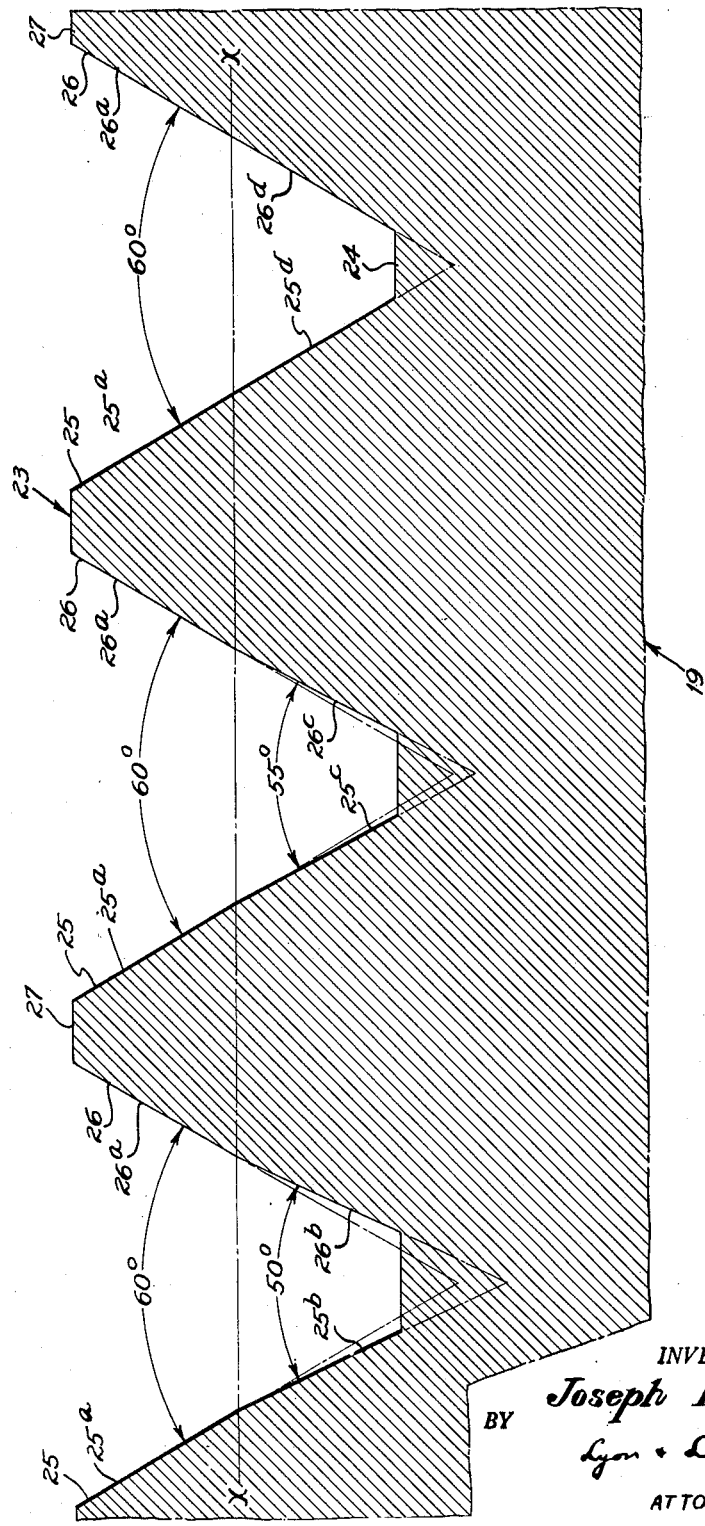

2,787,798

SWAGING TOOL FOR RECONDITIONING DEFORMED LOCK THREADS

Joseph Rosan, Newport Beach, Calif.

Application November 26, 1952, Serial No. 322,634

6 Claims. (Cl. 10—152)

This invention relates to screw threads, and more particularly, to a method and apparatus for reconditioning conventional or standard threads which have been converted, by modification of the crown thereof, into locking threads and have lost their maximum effectiveness as locking threads as a result of repeated assembly and disassembly operations.

In my copending application Serial No. 309,960, filed September 17, 1952, now abandoned, I have disclosed specially threaded self-locking elements adapted to be used in lieu of conventional bolts, nuts, etc., constructed so that when the specially threaded elements are screwed together with conventional threaded elements, the threads of the conventional elements are deformed in a manner to cause the same to be locked to the specially threaded elements.

In my copending application Serial No. 312,231, filed September 30, 1952, I have disclosed a special tool adapted to deform standard threads to convert the same into locking threads.

In my copending application Serial No. 313,280, filed October 6, 1952, I have disclosed specially threaded elements having a hard wire placed at the root of the thread for the purpose of deforming the crown or crest of a standard thread to automatically effect a locking engagement between the two when the parts are screwed together.

In each of the foregoing applications locking of the threaded elements is effected by the displacement of portions of the crown of one of the mating threads radially to increase the height of the thread and/or laterally outwardly in opposite directions from about the medial point of the crown to increase the width of the crown.

It is often highly desirable to convert standard threads into locking threads, particularly in apparatus which is subject to severe vibration and temperature change conditions, in order to prevent the threaded parts from loosening. For example, the standard female threads in a turbine housing, or engine block can be readily converted into locking threads by using special studs or cap screws embodying the principles of the inventions disclosed in applications Serial Nos. 309,960 and 313,280 supra, or by using the special tool disclosed in application Serial No. 312,231 supra. Should the female threads in such equipment lose their locking efficiency as the result of numerous disassembly and reassembly operations, it would be a difficult matter to remove these parts to a machine shop to have the threads reconditioned, and the tools described hereinafter are adapted to effect such reconditioning without requiring removal of such parts.

It is also highly desirable that standard threads which have been deformed to convert the same into locking threads retain their locking properties, irrespective of the number of times other threaded elements may be assembled or disassembled therewith. However, it is conceivable that a thread which has been deformed to impart locking properties thereto will eventually, after a great number of assembly and disassembly operations, lose some of its locking efficiency.

Accordingly, the principal object of the invention is to provide means for reconditioning or restoring a standard or conventional thread, which has been converted by deformation of its crown into a locking thread as described hereinbefore, to substantially the shape it had prior to its initial deformation. In other words, the principal object of the invention is to restore the crown of a modified standard thread to substantially its original contour so that it can be deformed anew to convert it into a locking thread that will offer a maximum of interference to rotation.

A further object of the invention is to provide a method and means whereby the deformed portions of a conventional thread can be gradually displaced and restored to substantially their original size and shape.

A still further object of the invention is to provide a method and tools adapted to restore deformed conventional threads to their initial conventional shape without cutting away any part of the threads.

Other objects and features of the invention will be apparent from the following description taken in conjunction with the accompanying drawings, in which:

Fig. 1 is a diagrammatic sectional view showing a fragment of a member provided with a standard female thread modified or deformed to convert it into a locking thread, and a fragment of a tool for restoring the crowns of the successive convolutions of the deformed thread to substantially their original standard contour;

Fig. 2 is a view of the complete tool shown in Fig. 1;

Fig. 3 is an enlarged fragmentary, diagrammatic, sectional view illustrating in detail the progressive change in shape of the leading threads of the tool of Figs. 1 and 2; and Fig. 4 is a view similar to Fig. 1 but illustrating a different form of tool primarily effective upon the inner surface of the deformed portions of the crown for restoring the thread to its original inside diameter.

Referring to Fig. 1 of the drawings, a fragment of a member 10 is shown provided with an internal thread 11 which was originally of standard or conventional form (as indicated by the dot-and-dash lines), but which has the crown thereof modified to convert it into a locking thread by deforming the crown laterally in opposite directions, and also radially inwardly to form the enlargements 12 and 12', with a groove 13 therebetween. For illustrative purposes it may be assumed that the thread 11 was originally an American National, class 3 thread, of conventional V-shaped configuration, although it is to be understood that the principles of the invention are equally applicable to all types of threads. It will also be understood that the female thread 11 could be present in a nut, or in a hole or opening in any member. The thread 11 has undistorted flank portions 14 and 15 with a 60° included angle therebetween. The distortion of the crown 16 from its normally smooth cylindrical condition, shown in dot-and-dash lines, to the shape shown in full lines may be effected by any of the means disclosed in my copending applications, supra.

The contour of the enlargements 12 and 12' may undergo some change after repeated threading and unthreading with an associated part (not shown) so that the original locking efficiency of the thread 11 may be impaired as a result of the change in contour. A tool generally identified by the numeral 19 is designed to restore the used thread 11 to substantially its original shape.

With specific reference to Fig. 2, the tool 19 comprises a shank 20 having an opening 21 extending therethrough and a bar 22 disposed in the opening to facilitate turning of the tool manually. The tool 19 further comprises a generally cylindrical portion of a suitable length and diameter greater than that of the shank 20, and provided with a helical thread 23 on the exterior thereof. The thread 23 has an outside diameter and pitch corresponding to that of a standard mating thread for the thread 11. However, the diameter of the root 24 of the thread 23 is preferably made a few thousandths, for example, .003 to .005 of an inch, smaller than the root diameter of the corresponding standard thread to provide greater than normal radial clearance in this region. The thread 23 further differs from a standard thread in that the flanks 25 and 26 thereof are rolled so that the included angle between adjacent confronting flanks is less at the root 24 than it is at the crown 27. Specifically, the flanks 25 and 26 are disposed at an included angle of 60° for only about half their depth corresponding to the distance from the crown 27 to the line X—X, and are disposed on an included angle which progressively increases from the first thread to successive threads in the region thereof disposed inwardly of the line X—X. Thus, the first or leading thread may have an included angle of 50°, the second thread an included angle of 55° and the third and remaining threads an included angle of 60°, as shown in Fig. 3. It will be understood that the angle of the first thread may be greater than 50° if desired and that the angularity of the threads gradually changes in a circumferential direction so that one thread convolution merges into the next without abrupt changes in the angle of the flanks. In other words, the flank angle changes 5° per complete convolution of the threads, i. e., from 50° to 55° for the first thread and 55° to 60° for the second thread and then remain constant at 60° for the remaining threads. The 5° angle change per convolution may be increased or decreased, depending upon the characteristics of the material containing the thread being restored. To facilitate later description, the portions of the flanks disposed outwardly of the line X—X have been designated $25^a$ and $26^a$ and those disposed inwardly of said line on a 50° angle have been designated $25^b$ and $26^b$, those disposed on a 55° angle have been designated $25^c$ and $26^c$, and those disposed on a 60° angle have been designated $25^d$ and $26^d$, respectively.

As the tool 19 is threaded into the member 10, the thread 23 thereof engages with the thread 11 to feed the tool into said member as the tool is manually rotated. As the tool 19 rotates, the flank portions $25^a$ and $26^a$ of the thread 23 will confront the flanks 14 and 15, respectively, of the thread 11, while the flank portions $25^b$ and $26^b$ will first be engaged with the enlargements 12 and 12′, respectively, and will progressively deform these portions laterally toward each other to reduce the width of the crown 16. The flank portions $25^c$—$26^c$ and $25^d$—$26^d$ will then successively engage the enlargements 12 and 12′ until said enlargements are displaced and the crown restored to a 60° angle. Such inward displacement is caused by the fact that the flank portions $25^b$—$26^b$ to $25^d$—$26^d$ are closer together axially than the side portions of the enlargements 12 and 12′ so that said enlargements are, in effect, gradually squeezed toward each other by the successive threads of increasing flank angle. In other words, they are deformed to restore the crown to substantially its original shape shown by the dot-and-dash lines in Fig. 1. At the same time, the reduced root diameter 24 of the tool thread 23 will provide any clearance necessary to accommodate any radially inward displacement of the portions 12 and 12′ that may be necessary in order to conform the thread 11 to the shape of the flank portions $25^b$—$26^b$, $25^c$—$26^c$, and $25^d$—$26^d$. In Fig. 1, the portion of the thread 11 designated $11^a$ diagrammatically illustrates a part of the thread 11 which has been fully reconditioned or converted back to substantially a standard 60° thread through the action of the tool 19.

Once the thread 11 has been converted back to substantially a standard thread, it can again be modified to convert it back into a locking thread by any one of the several means disclosed in my applications, supra, so that the full locking efficiency of the thread 11 can thus be easily restored. If necessary, or desired, the thread $11^a$ reconditioned by the tool 19 can have its inside diameter made uniform and/or enlarged to standard size, by inserting a second tool 28, Fig. 4, therein having a V-thread 29 of an outer diameter and pitch corresponding to the standard thread 11, but having a root 30 of a diameter preferably a few thousandths of an inch greater than the root diameter of the standard thread, so that the inside diameter of the thread being reconditioned can be readily enlarged to standard size. Alternatively, of course, the inside diameter of the reconditioned thread may be left, or enlarged to, less than standard size and this affords certain advantages, especially where substantial locking interference is subsequently desired between the crown of the reconditioned thread and means at the root of the mating thread to be used therewith.

The tool thread 29 has flanks 31 and 32 disposed on an angle of 60° relative to each other, thus corresponding to a conventional or standard thread. The reconditioned thread portion $11^a$ will, of course, have the flanks of the thread adjacent the crown disposed on an angle of about 60°, corresponding to the angle to which it was finally constrained between the 60° flank portions $25^d$ and $26^d$ of the first tool 19, so that the customary small standard tolerance will exist therebetween and the confronting portions of the flanks 31 and 32 of the thread 29 of the second tool 28. Therefore, as the tool 28 is threaded into the reconditioned thread $11^a$, the root portion 30 of the tool thread 29 will deform or displace the metal of the crown $11^b$ radially outwardly and laterally, so that the portion of the reconditioned thread marked $11^c$ will substantially correspond to the shape of the space between the flanks 31 and 32 and thus assume the configuration of a true standard thread.

Thus, the thread 11 can be reworked in a single stage by the tool 19 alone, or in two successive stages, if desired, by the tools 19 and 28 without any cutting of the thread, so that the reconditioned thread is substantially identical to its original standard size and shape or contour.

In many instances it will be unnecessary to further recondition the thread 11 by the use of the tool 28; whereas, with certain threads, both tools 19 and 28 may be advantageously employed to completely restore a standard thread modified into a locking thread back to substantially its initial condition of a standard thread.

It will be apparent that the disclosed principles of reconditioning a female thread without cutting away any part of the thread are equally applicable to male threads through the use of suitable rolling tool means.

It is to be understood that variations may be made in the contour of the reconditioning tools disclosed herein to suit various forms of threads, without departing from the principles of the invention or the scope of the annexed claims.

I claim:

1. A tool for reconditioning a conventional substantially 60° thread, which has been modified by increasing the size of the crown thereof, to convert the same back to substantially its size and shape before modification, comprising: a body having a substantially cylindrical portion provided with an uninterrupted helical thread the outer portion of its flanks corresponding to the initial outside diameter, flank angle, and pitch of the conventional thread to be reconditioned, but having the confronting portions of its flanks adjacent to the root of the thread disposed slightly farther apart than the corresponding flank portions adjacent to the root of the conventional thread and progressively increasing to a full thread angle of 60°.

2. A tool as defined in claim 1, wherein the included angle of the confronting flanks of the tool thread at its leading end is greater at the crown of the thread than at the root thereof.

3. A tool for reconditioning a conventional substantially 60° thread, which has been modified by increasing the size of the crown thereof, to convert the same back to substantially its size and shape before modification, comprising: a body having a substantially cylindrical portion provided with an uninterrupted helical thread coresponding to the initial diameter and pitch of the conventional thread to be reconditioned, but having the outer radial portions of the confronting flanks of adjacent threads disposed on an included angle of about 60° and having the inner radial portions of said confronting flanks at the root of successive threads at the leading portion of the tool disposed on progressively increasing included angles up to a full thread angle of substantially 60°, the included angle between confronting flanks of the tool thread at the leading portion of the tool being less at the roots than at the crests thereof.

4. A tool as defined in claim 3, wherein the root diameter of the tool thread is slightly less than the root diameter of the corresponding conventional thread.

5. A tool as defined in claim 3, wherein the angularity of the respective flanks changes at a point about halfway of the height of the tool thread.

6. A tool as defined in claim 3, wherein the angularity of the respective flanks changes at a point about halfway of the height of the tool thread, and in which the included angle between the confronting flanks of the leading threads thereof progressively increases from about 50° to 60° at their roots.

References Cited in the file of this patent

UNITED STATES PATENTS

| | | |
|---|---|---|
| 1,114,158 | Lovell | Oct. 20, 1914 |
| 1,369,156 | Woodward | Feb. 22, 1921 |
| 1,676,482 | De Lapotterie | July 10, 1928 |
| 1,912,517 | De Lapotterie | June 6, 1933 |
| 2,530,268 | Schaid | Nov. 14, 1950 |